(12) United States Patent
Haag et al.

(10) Patent No.: US 11,351,868 B2
(45) Date of Patent: Jun. 7, 2022

(54) ELECTRICAL TRACTION DRIVE FOR A VEHICLE

(71) Applicant: ZIEHL-ABEGG AUTOMOTIVE GMBH & CO. KG, Kupferzell (DE)

(72) Inventors: Alexander Haag, Ingelfingen (DE); Sascha Klett, Oppenweiler (DE); Ralf Arnold, Künzelsau (DE)

(73) Assignee: ZIEHL-ABEGG AUTOMOTIVE GMBH & CO. KG, Kupferzell (DE)

( * ) Notice: Subject to any disclaimer, the term of this patent is extended or adjusted under 35 U.S.C. 154(b) by 298 days.

(21) Appl. No.: 16/322,867

(22) PCT Filed: Jul. 21, 2017

(86) PCT No.: PCT/DE2017/200070
§ 371 (c)(1),
(2) Date: Feb. 1, 2019

(87) PCT Pub. No.: WO2018/024296
PCT Pub. Date: Feb. 8, 2018

(65) Prior Publication Data
US 2019/0202294 A1    Jul. 4, 2019

(30) Foreign Application Priority Data
Aug. 2, 2016 (DE) ................ 10 2016 214 275.5

(51) Int. Cl.
| | | |
|---|---|---|
| *B60L 3/00* | (2019.01) | |
| *H02P 5/74* | (2006.01) | |
| *B60L 7/26* | (2006.01) | |
| *B62D 63/04* | (2006.01) | |
| *H02K 7/116* | (2006.01) | |
| *B60K 6/20* | (2007.10) | |
| *H02J 7/14* | (2006.01) | |
| *B60K 6/26* | (2007.10) | |
| *H02P 5/695* | (2006.01) | |

(52) U.S. Cl.
CPC ............. *B60L 3/0092* (2013.01); *B60K 6/20* (2013.01); *B60L 7/26* (2013.01); *B62D 63/04* (2013.01); *H02K 7/116* (2013.01); *H02P 5/695* (2013.01); *H02P 5/74* (2013.01); *B60K 2006/266* (2013.01); *B60L 2220/44* (2013.01); *H02J 7/143* (2020.01); *Y02T 10/64* (2013.01)

(58) Field of Classification Search
CPC .......... B60K 2006/266; B60K 2220/44; B60K 6/20; B60L 3/0092; B60L 7/26; H02P 5/74; H02P 5/695; H02J 7/143; Y02T 10/64; B62D 63/04; H02K 7/116
USPC ................................... 307/9.1, 10.1
See application file for complete search history.

(56) References Cited

U.S. PATENT DOCUMENTS 6,295,487 B1 * 9/2001 Ono .................... B60K 23/0808
701/22

FOREIGN PATENT DOCUMENTS

| DE | 19910091 | 8/2000 |
|---|---|---|
| DE | 102005004330 | 8/2006 |
| WO | 2014048462 | 4/2014 |

* cited by examiner

*Primary Examiner* — Arnold M Kinkead
(74) *Attorney, Agent, or Firm* — Jason P. Mueller; FisherBroyles, LLP

(57) ABSTRACT

In an electrical traction drive for a vehicle comprising at least two individual wheel drives that are to be controlled independently of each other, the drives are able to be operated redundantly in order for an emergency operating function to be implemented.

21 Claims, 5 Drawing Sheets

ELECTRICAL TRACTION DRIVE FOR A VEHICLE

PRIORITY INFORMATION

This application is a national stage entry under 35 U.S.C. 371 of PCT Patent Application No. PCT/DE2017/200070, filed Jul. 21, 2017, which claims priority to German Patent Application No. 10 2016 214 275.5, filed Aug. 2, 2016, the entire contents of each of which are incorporated herein by reference.

The present disclosure relates to an electrical traction drive for a vehicle, wherein the vehicle comprises individually driven wheels of the drive axle(s).

The concept "vehicle" is to be understood in the broadest sense, including personal vehicles, busses, commercial vehicles, and special-purpose vehicles.

If damage occurs in the drive system in hybrid vehicles or battery-operated vehicles, in particular to an internal combustion engine, an electrical engine, the transmission, the differential, a converter or to the high-voltage battery, the vehicle can no longer be moved from its position and is designated as a so-called "dead vehicle". Such "dead vehicles" constitute an obstruction and a danger to street traffic. The necessary towing results in additional significant expenses.

Figure 1:
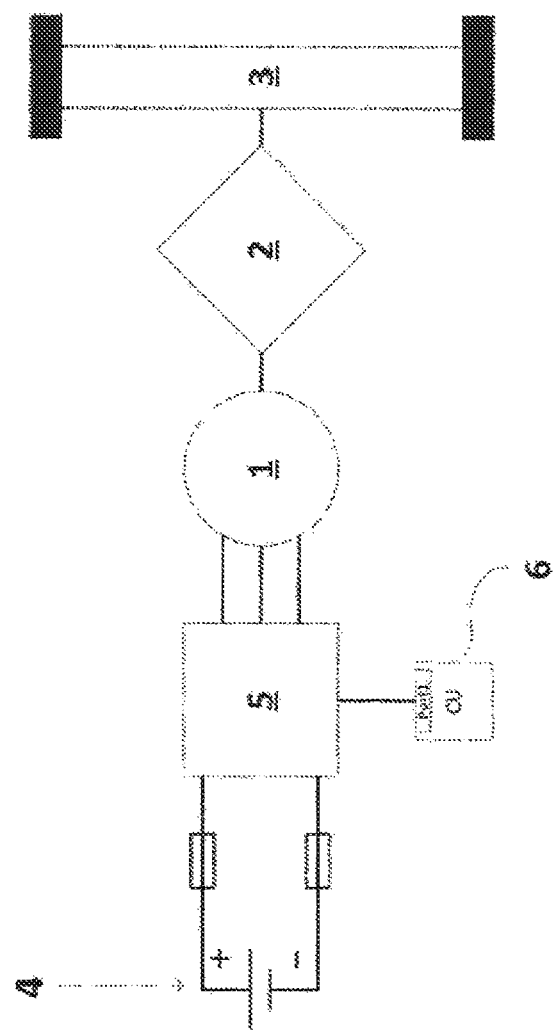

Hybrid vehicles usually comprise an electrical central engine as well as a transmission and a differential for the internal combustion engine. Refer to FIG. 1 for this prior art. The central engine is supplied with electrical energy by a high-voltage battery and a converter. A control device serves to control the central engine.

Electrical individual wheel drives with transmission translation and individual wheel drives without a transmission as a direct drive are already known from the practice, namely, so-called wheel hub engines. They are used in the area of passenger cars and also in the area of commercial vehicles and busses as well as in special-purpose vehicles.

Regardless of the concrete construction, in the case of damage to the drive system, a further travel with the drive of the vehicle is no longer possible due to a blockage of rotating parts in the drive train. The dead vehicle must therefore be towed or repaired on site. This constitutes a danger for drivers, passengers and third parties, in particular at dangerous locations such as curves with poor vision, at construction sites, multilane vehicle roads/expressways/autobahns, at railroad crossings, etc.

Figure 2:
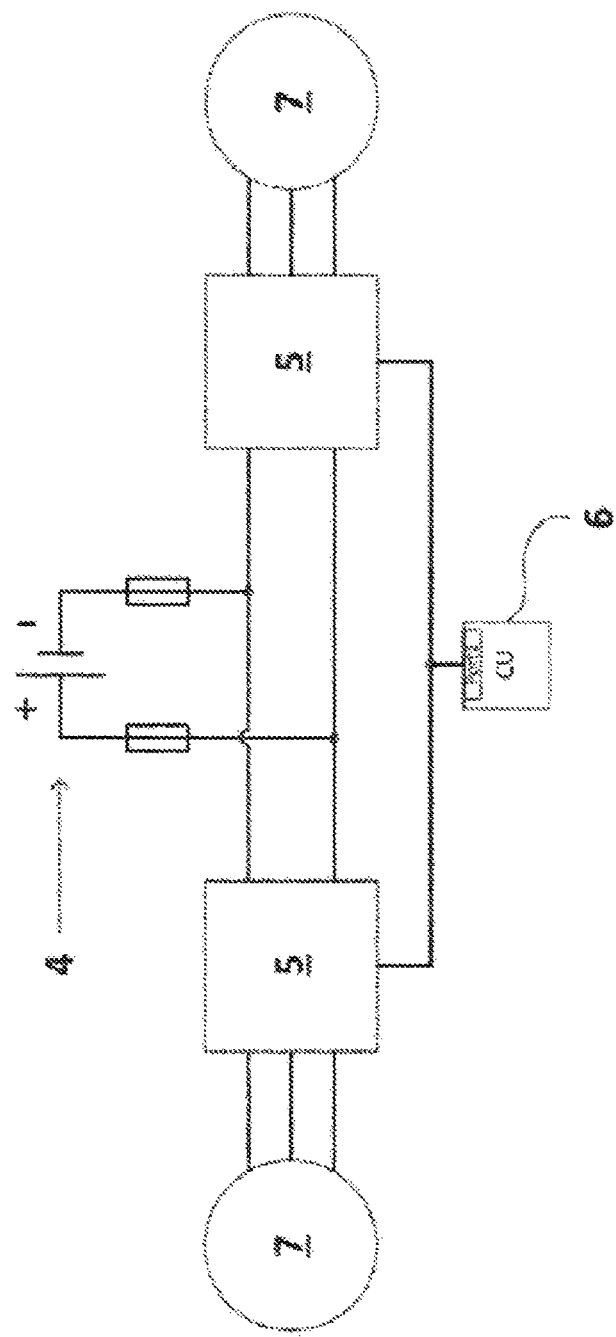

The simple linking of so-called wheel hub drives is known from the prior art known from practice. They are integrated into the drive train and the result is a central securing of the individual wheel drives as well as a control via a single interface in the control device of the drive (FIG. 2). This does not make reliable emergency operation possible since, for example, an error in the current supply can deactivate both drives. An error in the data bus line would also result in a loss of the function of both drives. Therefore, a real emergency operation is not possible according to the prior art.

The present disclosure is directed to the task of creating an electrical traction drive for a vehicle with individually driven wheels which makes an emergency operation possible with simple means without special construction expense in order to avoid a dead vehicle. The emergency operation should at least make it possible to drive the vehicle independently out of the danger zone. In the ideal case it should be possible to drive the vehicle independently to the next service station.

The above task is solved by the features of the claims. Accordingly, in the case of an electrical traction drive for a vehicle which comprises at least two individual wheel drives on an axle which can be controlled independently of each other, the emergency operating function is realized in that the drives are capable of functioning redundantly. This means at least that if both individual wheel drives are not defective, one of the drives can operate in the emergency operation.

In order to realize or implement the emergency operating function, both individual wheel drives have their own control- and/or performance linkage in the sense of a subsystem. To this end, the linkage or the subsystem can comprise two separate data bus interfaces in a central axial drive control device, namely, for the direct or indirect control of the particular individual wheel drives. To this extent the dependency on a single data bus line is eliminated.

Furthermore, the linkage or the subsystem can comprise an emergency energy source which makes available the necessary energy for the performance component of a particular converter.

The emergency energy source can preferably be an energy producer or the energy producer can be a component of the emergency energy source. The latter can be a generator, solar cells, etc.

The emergency energy source can preferably be an accumulator or a battery which is made available in a rather small construction and with a rather low performance. The emergency energy source serves to supply voltage and current for the individual wheel drives in the emergency operation, wherein the latter is reduced in its performance, and in particular the emergency energy source serves exclusively for ensuring the emergency operating function.

It is also conceivable that the emergency energy source brings about an asymmetrical traction or the drive of an individual drive wheel in order to move the vehicle independently out of the danger zone or to drive it to the next service station at a reduced speed.

It is basically conceivable that the emergency operating function, i.e., the emergency operation, can be automatically actuated upon the detection of given parameters. The detection can take place, for example, from a control device or a battery management system.

Also, and in the framework of an especially simple embodiment, it is conceivable that the emergency operating function, i.e., the emergency operation can be actuated manually, namely, when the damage/defect has occurred. Then, for example, the emergency energy source and/or the special control mechanisms of the subsystem bringing about the emergency operating function are actuated with the actuation of the emergency operating function. The direction of travel can be selected with or after actuation of the emergency operating function so that the vehicle can be maneuvered sufficiently well. For this, the gas pedal can serve for the customary actuation or can act on a suitable switching device or regulating device (lever, etc.).

A low-voltage signal actuating the emergency operating function can be run directly via a control line or via the control device for the axial drive to the converter and at least to one of the individual drives. It is important here that the same converter is actively supplied with energy, if necessary from the emergency energy source.

The actual driving operation is realized by a regulating current in the converter, wherein the amount of the regulating current can be saved in software associated with the converter. The subsystem of the emergency operating function also uses this software to ensure a sufficient energy supply in the emergency operation.

The emergency operating function is implemented mainly or completely by software. Accordingly, it can be retrofitted in existing drives. In particular the algorithmic system of the emergency operating function is entirely or at least partially saved as software in the converter control device in an original or in a redundant, secondary hardware area.

It is also conceivable that the emergency operating function, in particular the algorithms of the emergency operating function, are saved entirely or at least partially as software in the battery management system.

As already previously explained, a more extensive damage to the drive system can be avoided by the software of the emergency operating function, namely, in that it invokes a limitation of the performance in the emergency operating function, optionally taking account of the particularly detected or determined defect.

Figure 3:
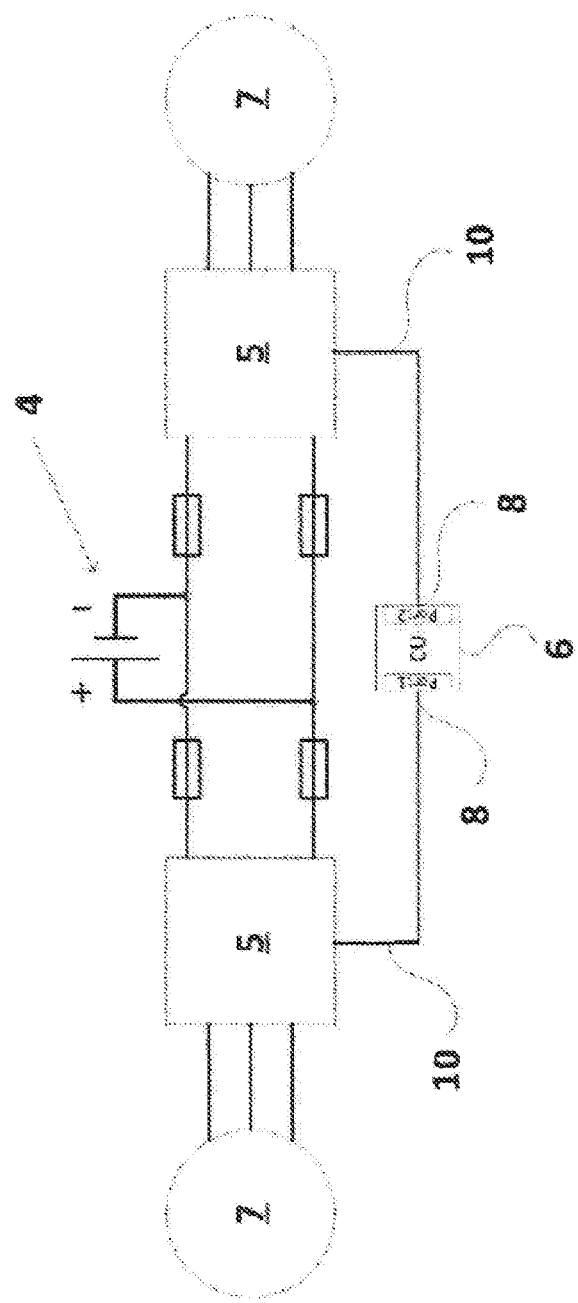
Figure 4:
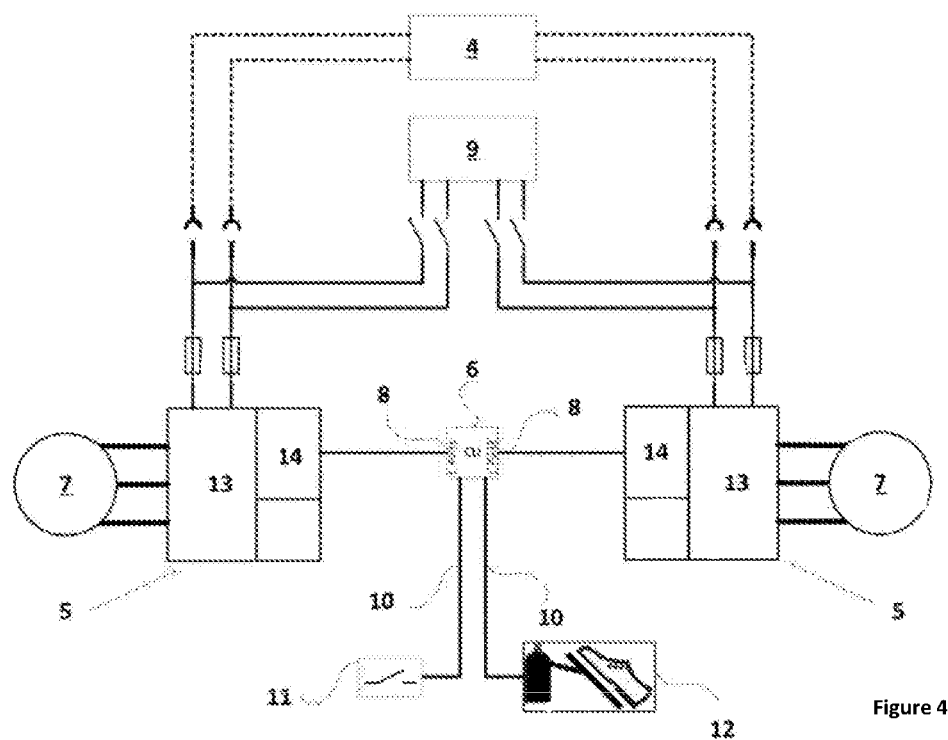
Figure 5:
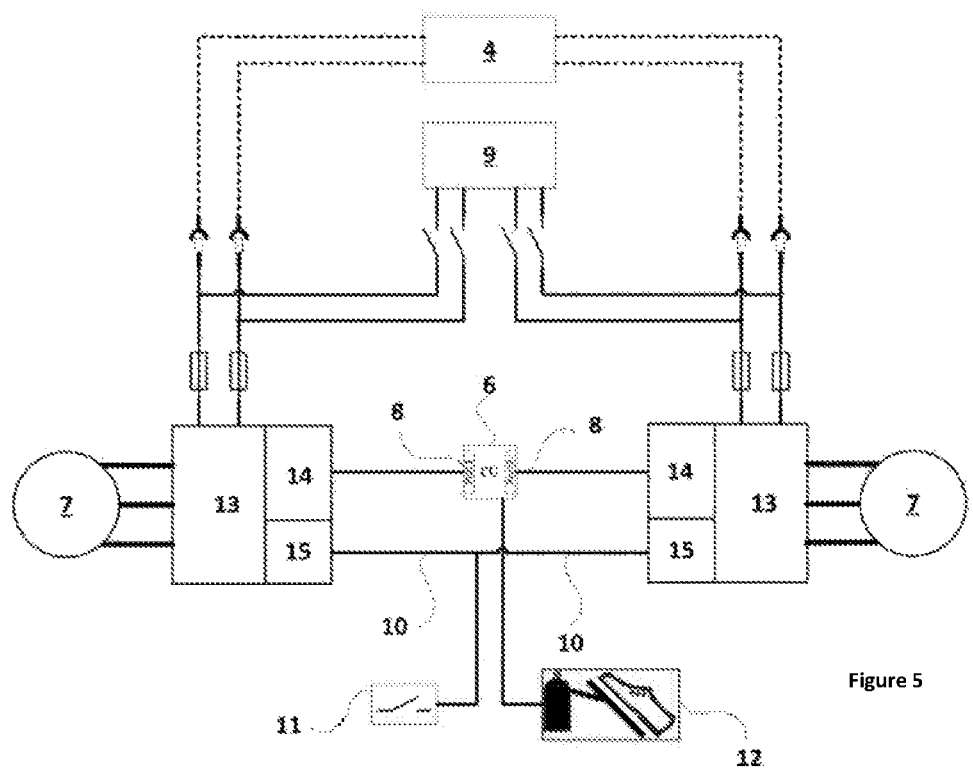

There are several possibilities for designing and further developing the teaching of the present disclosure in an advantageous manner. Refer in this regard on the one hand to the claims s and on the other hand to the following explanation of preferred exemplary embodiments of the disclosure with reference made to the drawings. Generally preferred embodiments and further developments of the teaching are explained in combination with the explanation of the preferred exemplary embodiment of the disclosure with reference made to the drawings. In the drawings:

FIG. 1 shows a schematic view of a drive comprising an electrical central engine with a simple linkage (prior art), FIG. 2 shows a schematic view of a drive comprising wheel hub drives with a simple linkage (prior art), FIG. 3 shows a schematic view of a first exemplary embodiment of a drive according to the disclosure with two wheel hub drives on one axle and a simple linkage, realizing an emergency operation, FIG. 4 shows a schematic view of a second exemplary embodiment of a drive according to the disclosure with two wheel hub drives on one axle and a simple linkage, realizing an emergency operation, and FIG. 5 shows a schematic view of a third exemplary embodiment of a drive according to the disclosure with two wheel hub drives on one axle and an additional linkage, realizing an emergency operation.

FIG. 1 shows a schematic view of a drive from the prior art and for example of a hybrid vehicle related to the electrical part of the drive. A central engine 1 is provided as an electrical engine which acts via a differential 2 on an axle 3.

The central engine 1 is supplied with energy by an energy source 4 (customarily a HV battery), which source, controlled by the converter 5, supplies the central engine 1 with electrical energy via a drive control device 6.

FIG. 2 shows a variant which is also already known from the practice, namely, the providing of two wheel hub drives 7 with a simple linkage. Even here, the two drives are supplied with high voltage direct voltage from an energy source 4. The drive control device 6 controls the two drives 7 by a converter 5 associated with the particular drive 7, wherein the functional block containing the converter 5 can comprise other functional elements.

FIG. 3 shows an exemplary embodiment of a drive according to the disclosure with a realized emergency operation in which a linkage is provided. Both wheel hub drives 7 have as a subsystem their own linkage. This means in detail a separate securing of the energy source 4 and of the high-voltage direct voltage supply. Furthermore, two separate data bus interfaces 8 are provided in the central drive control device 6 (CU) for the control.

An energy source alternative to the energy source 4 (high-voltage battery) can be optionally used for supplying the drives.

It must be ensured in the framework of the embodiment which can be gathered from FIG. 3 that a control line 10 is actively present in the low-voltage range of an emergency operation switch which is not shown there to the converter 5 from at least one wheel hub drive 7 and that an energy supply 4 is actively present on the same converter 5. The control line 10 can be directly connected via the drive control device 6 to the converter 5. Alternatively, a connection via CAN bus of the emergency operation switch to the converter is possible.

FIG. 4 shows another exemplary embodiment of the drive according to the disclosure, wherein an emergency energy source 9 is provided in addition to the actual energy source 4. The emergency energy source can be a high-voltage battery like the actual energy source 4, wherein a battery management system (BMS) can be associated with the actual energy source 4 as well as with the emergency energy source 9. The BMS can be a partial area or a subunit of the entire arrangement of the energy supply. The arrangement of the energy source 4 and of the emergency energy source 9 can be tested for a complete or conditioned functionality by a preferably integrated software analysis system.

According to the arrangement in FIG. 4, it is ensured that a control line 10 in the low-voltage range of an emergency operation switch 11 on the converter 5 runs to at least one of the drives 7. Concretely speaking, the control line 10 runs from the emergency operation switch 11 via the axial drive control device 6 to the converter 5. At the same time, it must be ensured that the energy supply is actively present on the same converter 5 either via the actual energy source 4 or via the emergency energy source 9. It is essential that the control line 10 can be connected to the converter 5 via the drive control device 6 or directly. The actuation can then take place in the emergency operation via the gas pedal 12 and the direction switch 11.

If the supply voltage of the energy source 4 fails, an emergency voltage from the emergency energy source 9 is connected or activated via additional connection points which emergency voltage makes the required energy available for the performance part 13 of the converter 5.

FIG. 5 shows another embodiment of a drive according to the disclosure. It comprises the functional unit of the converter 5. In addition to the signal part 14, an additional area 15 is provided so that the emergency operation can be operated by a separate interface. The providing of the regulating current takes place again via the control line 10, wherein the signal is initiated by a selector switch 11 or by an analog value sensor. The gas pedal 12 can be actuated in a customary manner in the emergency operation.

In order to avoid repetitions, refer regarding other advantageous embodiments of the teaching of the disclosure to the general part of the specification and to the attached claims.

Finally, it is expressly pointed out that the previously described exemplary embodiments of the teaching of the disclosure serve only to explain the claimed teaching but do not limit it to the exemplary embodiments.

LIST OF REFERENCE NUMERALS 1 central engine, electrical engine
2 differential
3 axle 4 energy source
5 converter, converter unit
6 drive-control device
7 wheel hub drive, individual drive
8 data bus interface
9 emergency energy source
10 control line
11 emergency operation switch, selective switch, direction switch
12 gas pedal
13 performance part of the converter
14 signal part of the converter
15 additional signal part for emergency operation control

The invention claimed is:

1. An electrical traction drive for a vehicle comprising at least two individual wheel drives which are controlled independently from each other,
wherein said electrical traction drive includes two individually driven wheels on an axle and a shared energy source for the two individually driven wheels on the axle,
wherein, to perform an emergency operating function, the individual wheel drives are configured to function redundantly,
wherein, to avoid a dead vehicle, said emergency operating function provides a fail-safe in such a way that at least one of the individual wheel drives is able to operate if both individual wheel drives are not defective at the same time,
wherein the individual wheel drives each include a subsystem that includes at least one of a control linkage and a performance linkage, and
wherein each subsystem further includes a separate data bus interface in a central axial drive control device for controlling the individual wheel drives.

2. The electrical traction drive according to claim 1, wherein the subsystem is configured to receive energy from an emergency energy source which provides energy necessary for the performance component of a particular converter.

3. The electrical traction drive according to claim 2, wherein the emergency energy source is an energy producer.

4. The electrical traction drive according to claim 2, wherein the emergency energy source is an accumulator or a battery.

5. The electrical traction drive according to claim 2, wherein the emergency energy source is a power supply device or a voltage converter.

6. The electrical traction drive according to claim 2, wherein the emergency energy source serves as a reduced voltage control or a current control of the individual wheel drives.

7. The electrical traction drive according to claim 2, wherein the emergency energy source brings about a symmetrical traction, an asymmetrical traction, or drive of an individual drive wheel.

8. The electrical traction drive according to claim 1, wherein the emergency operating function is configured to be automatically actuated upon detection of given parameters.

9. The electrical traction drive according to claim 1, wherein the emergency operating function is configured to be actuated by switch, key, or foot pedal.

10. The electrical traction drive according to claim 8, wherein a direction of travel is selectable during actuation of the emergency operating function or after actuation of the emergency operating function.

11. The electrical traction drive according to claim 1, wherein a low-voltage signal actuating the emergency operating function is run directly to a converter of at least one of the individual wheel drives via a control line or via the central axial drive control device, and wherein the same converter is actively supplied with energy.

12. The electrical traction drive according to claim 11, wherein an actual driving operation is implemented by a regulating current in the converter, and wherein an amount of the regulating current is saved in software associated with the converter.

13. The electrical traction drive according to claim 1, wherein the emergency operating function is implemented mainly or completely by software and is configured to be retrofitted in existing drives.

14. The electrical traction drive according to claim 1, wherein algorithms of the emergency operating function; are entirely or at least partially saved as software in an engine control device in an original hardware area or in a redundant, secondary hardware area.

15. The electrical traction drive according to claim 1, wherein algorithms of the emergency operating function; are entirely or at least partially saved as software in a converter or alternately in a motor control device.

16. The electrical traction drive according to claim 12, wherein a performance limitation is saved in the software of the emergency operating function to avoid further damage to the drive system.

17. An electrical traction drive for a vehicle comprising at least two individual wheel drives which are controlled independently from each other, wherein, to perform an emergency operating function, the individual wheel drives are configured to function redundantly, the individual wheel drives each have a subsystem that includes a least one of a control linkage and a performance linkage, wherein the subsystem is configured to receive energy from an emergency energy source which provides energy necessary for the performance component of a particular converter, and the emergency energy source is a power supply device or a voltage converter, wherein each subsystem further includes a separate data bus interface in a central axial drive control device for controlling the individual wheel drives.

18. An electrical traction drive for a vehicle comprising at least two individual wheel drives which are controlled independently from each other,
wherein, to perform an emergency operating function, the individual wheel drives are configured to function redundantly,
wherein, to avoid a dead vehicle, said emergency operating function provides a fail-safe in such a way that at least one of the individual wheel drives is able to operate if both individual wheel drives are not defective at the same time, and
the emergency operating function is implemented mainly or completely by software and is configured to be retrofitted in existing drives.

19. The electrical traction drive according to claim 17, wherein said electrical traction drive includes two individually driven wheels on an axle and a shared energy source for the two individually driven wheels on the axle.

20. An electrical traction drive for a vehicle comprising at least two individual wheel drives which are controlled independently from each other,
wherein said electrical traction drive includes two individually driven wheels on an axle and a shared energy source for the two individually driven wheels on the axle, wherein, to perform an emergency operating function, the individual wheel drives are configured to function redundantly, wherein the individual wheel drives each include a subsystem that includes at least one of a control linkage and a performance linkage, wherein each subsystem further includes a separate data bus interface in a central axial drive control device for controlling the individual wheel drives, and wherein a low-voltage signal actuating the emergency operating function is run directly to a converter of at least one of the individual wheel drives via a control line or via the central axial drive control device, wherein the same converter is actively supplied with energy.

21. The electrical traction drive according to claim 20, wherein an actual driving operation is implemented by a regulating current in the converter, and wherein an amount of the regulating current is saved in software associated with the converter.

* * * * *